US00RE42168E

(19) United States
(12) Reissued Patent
Jenkins et al.

(10) Patent Number: US RE42,168 E
(45) Date of Reissued Patent: *Feb. 22, 2011

(54) CORE COMPUTER UNIT

(75) Inventors: Michael D. Jenkins, Burke, VA (US); John F. Moynahan, Fairfax, VA (US)

(73) Assignee: Xybernaut Corp., Chantilly, VA (US)

( * ) Notice: This patent is subject to a terminal disclaimer.

(21) Appl. No.: 09/976,768

(22) Filed: Oct. 12, 2001

Related U.S. Patent Documents

Reissue of:
(64) Patent No.: 5,999,952
Issued: Dec. 7, 1999
Appl. No.: 09/009,206
Filed: Jan. 20, 1998

U.S. Applications:
(63) Continuation-in-part of application No. 08/911,642, filed on Aug. 15, 1997, now Pat. No. 6,029,183.

(51) Int. Cl.
*G06F 1/16* (2006.01)
*H05K 7/10* (2006.01)

(52) U.S. Cl. ..... 708/100; 361/679.4; 361/679.21
(58) Field of Classification Search ..... 708/100, 708/105; 361/683, 686, 730, 731
See application file for complete search history.

(56) References Cited

U.S. PATENT DOCUMENTS

| | | | | | |
|---|---|---|---|---|---|
| 5,264,992 | A | * | 11/1993 | Hogdahl et al. | 361/681 |
| 5,305,244 | A | * | 4/1994 | Newman et al. | 708/141 |
| 5,313,596 | A | * | 5/1994 | Swindler et al. | 710/303 |
| 5,384,686 | A | * | 1/1995 | Mesfin et al. | 361/686 |
| 5,436,857 | A | | 7/1995 | Nelson et al. | |
| 5,463,742 | A | * | 10/1995 | Kobayashi | 710/303 |
| 5,550,710 | A | * | 8/1996 | Rahamim et al. | 361/687 |
| 5,608,608 | A | | 3/1997 | Flint | |
| 5,708,840 | A | * | 1/1998 | Kikinis et al. | 708/105 |

FOREIGN PATENT DOCUMENTS

WO 9218924 10/1992

* cited by examiner

*Primary Examiner*—Chuong D Ngo

(57) ABSTRACT

This invention provides a core computer unit that contains all of the components of a conventional computer however will not function unless it is positioned in an enclosure. The enclosure dictates the computer function, the core unit supplies the computer components. The core unit remains dormant and non-functional until it is positioned in a compatible enclosure.

8 Claims, 2 Drawing Sheets

CORE COMPUTER UNIT

Matter enclosed in heavy brackets [ ] appears in the original patent but forms no part of this reissue specification; matter printed in italics indicates the additions made by reissue.

This invention relates to a computer structure and more specifically to a transferable mobile core unit that can be transported for use to many enclosures. This application is a continuation-in-part of U.S. Ser. No. 08/911,642 filed in the U.S. Patent and Trademark Office on Aug. 15, 1997.

BACKGOUND OF THE INVENTION

In Parent Application Ser. No. 08/911,642, a system is described wherein a core unit comprising all of the components of a conventional computer is used with any of a plurality of enclosures, each enclosure could have the same or an entirely different function. For example, an enclosure could be a conventional desktop, laptop or mobile computer (such as disclosed in U.S. Pat. No. 5,305,244) containing a removable core unit. The same core unit also can be detached from this conventional computer and used in an automobile enclosure or other enclosure that has a completely different function than the previously used enclosure.

The core unit disclosed in parent application Ser. No. 08/911,642 (which is incorporated by reference in this disclosure) as in the present invention, has all of the components of a general purpose computer (hereinafter "conventional computer") i.e., a CPU, internal storage means, memory means, activation means, video display controller, input/output controller means, as well as an external contact with enclosures. When the terms "conventional computer" and "self-contained computer" are used herein, they define the computer structure illustrated in the drawings accompanying this disclosure. "Self-contained" or "conventional computer" is further defined as a structure with all of the components of a conventional computer (except for power and display), however, when used in an enclosure, has built-in capacity to interface with external sources of data, information or peripherals of any kind. The self-contained core unit of this invention has means for electrical connection to a plurality of different enclosures, each enclosure defining the usage to be desired. For example, different "enclosures" such as mobile, laptop or base computers, cars, appliances, television, home systems such as alarms, electrical and heating systems, office units and equipment such as copiers, fax machines, telephones, dictating equipment, or any other suitable enclosure may be used with the core unit of this invention. This defines what is meant by "enclosure" in the present invention.

In commonly owned U.S. Pat. No. 5,305,244 and U.S. patent application Ser. No. 08/538,194 and its continuation application (filed May 22, 1997) and Ser. No. 08/911,642 filed on Aug. 15, 1997 a mobile user supported computer apparatus is disclosed in the first two applications having means for attachment of the computer and display or just the display to a user. The user supported computer disclosed in these applications or patent is commercialized under the trademark "Mobile Assistant", which is a registered mark of Xybernaut Corporation of Fairfax, Va. The Mobile Assistant is very lightweight, versatile, efficient, can be attached to a user and is voice activated thereby leaving the user's hands free to repair or otherwise carry on the work being done.

There are known various systems for using removable modules for use in other computers or structures. These modules typically have only one function and are not a fully functional independent computer. Also known are removable dockable mobile computers that are fully functional computers that may be inserted onto a docking station to further enhance their functions. It is important to note that these prior art dockable computers are fully functional computers independent from and apart from their docking stations. Some of the systems are disclosed in U.S. Pat. Nos. 5,488,572; 5,526,493; 5,608,608; 5,627,974; 5,632,020; and various PCT publications WO 94/1637; WO 93/00627 and WO 90/11628. In U.S. Pat. No. 5,488,572 (Belmont) a notebook computer which is fully functional before docking is docked on a motorized expansion base unit. Before the docking event occurs, the notebook computer communicates with the expansion base unit via a sense signal. This notebook computer and docking station are specifically designed to work together and interact. The notebook computer is not a universal computer that can be used with other docking stations indiscriminately. In Belmont if the expansion base unit determines that the notebook computer is in a proper state for docking, it activates its motor to load the notebook computer. This is a very specifically designed system where the notebook computer and the docking station must be specifically structured to accept each other. The docking base unit cannot accept other computers not intended to be compatible therewith.

U.S. Pat. No. 5,526,493 (Shu) discloses another docking system for computer expansion. The Shu system relieves a computer user of the task of manually placing the portable computer in the suspend mode prior to docking with the docking station. Here again the portable computer 12 of Shu is a fully functional computer before docked with docking station 14.

U.S. Pat. No. 5,608,608 (Flint) discloses the use of two chassis and an independent cartridge having separate functional components that interface with one another over a common bus. Flint's cartridge has only a processor and memory combined to a second bus and at least one slot for housing a communication module that is coupled to a second bus. The cartridge is intended for use in laptops, notebook and sub-notebook computers. The cartridge of Flint does not process the functions generally required in a general purpose computer, specifically storage means for data, operating systems and software, and video display interface electronics, all of which are contained in the chassis of Flint, not the Flint cartridge. Therefore, the cartridge is dependent on at least one of the two chassis for data retrieval, operating software, application software and video interface, all of which are needed for full functionality of the computer as a whole. As will be described later in this disclosure, the presently described invention contains all of the storage, processing, video interface, and software in the core unit, which allows this core to be used with any closed housing without concern for the version of operating software, application software or video setting. In Flint, these settings must all match properly for the computer to function. In addition, Flint requires three separate components (two chassis and the cartridge) while the invention herein requires only two components.

Watts U.S. Pat. No. 5,627,974 provides a computer docking system having connection means for connecting a portable computer to a docking station, and means for allowing a microprocessor in the docking station to talk to underlying software using the central processing unit of the portable computer. The portable computer of Watts is fully functional before and after docking; it can perform the usual computer functions without being docked.

Gephardt U.S. Pat. No. 5,632,020 discloses a dockable computer system capable of hot or warmn docking, the bus arbiter grants exclusive non-preemptive access to the buses to the docking agent which is capable of quieting (rendering inactive) the bus of the portable computer and docking station in response to a notice signal. All of the PCT publications noted above disclose conventional inter-docking stations which accept a mobile computer to become with the mobile computer an active desktop computer unit.

None of the above prior art discloses the concept of a standardized mobile core unit that has universal usage in a plurality of standard enclosures.

SUMMARY OF THE INVENTION

It is therefore an object of this invention to provide a core computer unit devoid of the above noted disadvantages.

Another object of this invention is to provide a transferable core unit that will not function unless it is used together with an enclosure.

A further object of this invention is to provide a self-contained core unit that has all of the components of a conventional computer, but which is usable in different environments or enclosures.

Still a further object of this invention is to provide a self-contained core unit that is easily used even by users without any computer training.

Yet another object of this invention is to provide a self-contained uniquely designed core unit that can be used in entirely different ways in entirely different enclosures.

Again another object of this invention is to provide a uniquely designed core unit that can either be transferably used or permanently used in one or more enclosures.

Another yet further object is to provide a simple, compact, portable core unit that will only function when its connector is in contact with the connector of an enclosure.

These and other objects of this invention are accomplished generally speaking by a transferable, removable and portable computer core unit, included in a single housing which is critical to this invention. The core unit of this invention is simple, uncomplicated and is carried in a single closed housing, only to be easily removed or inserted as a unit into a mating enclosure. The core unit of this invention has preferably only one uniquely configured connecting means which mates with or fits against a power connector source, or activating means in an enclosure. Other than this connecting means, all of the components of the core unit are sealed and not removable from the core housing. This same connecting means also provides communication or transfer of information over a bus or in a wireless fashion. In the core unit all of the computer components stay intact unlike the prior art where for example the CPU is removed and replaced with a second CPU or other components. The security offered by the core unit is provided by uniquely structured mating connection means on the outer housing which connects to a mate connector in the enclosure. In the event that the core unit is lost or misplaced, it's data cannot be used, read or printed out by others because it can only be activated by connection to an equally unique mating connector in the enclosure. Also for security reasons, the core unit is in a completely closed housing so that no computer component may be removed, copied or tampered with. This feature is critical to this invention.

By "enclosure," "enclosed" or "enclosing" is meant throughout this disclosure and claims, that the core unit is connected or at least partially housed by the enclosure. By the term "communication activation means" is meant wireless transmission or communication, radio, cellular communication, and the like.

As above noted, the core unit of the present invention is entirely different than the computer devices of the prior art; in particular, the cartridge unit of U.S. Pat. No. 5,608,608 earlier discussed. U.S. Pat. No. 5,608,608 (Flint) discloses the use of two chassis and a cartridge having separate functional components that interface with one another over a common bus. Flint's cartridge has only a processor and memory combined to a second bus and at least one slot for housing a communication module that is coupled to a second bus. The cartridge is intended for use in laptops, notebook and sub-notebook computers. The cartridge of Flint does not process the functions generally required in a general purpose computer, specifically storage means for data, operating systems and software and video display interface electronics, both of which are contained in the chassis of Flint, not the cartridge.

Therefore, the cartridge of Flint is dependent on the two chassis for data retrieval, operating software application, software and video interface, all of which are needed for full functionality of the computer as a whole. As will be described later in this disclosure, the presently-described core unit of this invention contains all of the storage, processing, video interface and software in the core unit which allows this core to be used with any housing without concern for the version of operating software, application software or video selling. In Flint, these settings must all match properly for the computer to function. In addition, Flint requires three separate components (two chassis and the cartridge) while the invention herein requires only two components. Furthermore, Flint allows the chassis to be user configurable whereas the core unit of the present invention does not.

Finally, the cartridge of Flint permits external peripheral devices or ports (e.g. PCMCIA) to be an integral part of the cartridge. Conversely, the present invention does not allow any peripheral devices or external peripheral ports to be integral in the core unit since it (core unit) has components in a completely closed housing thereby providing a secure tamper-proof core unit. The only communication with the interior components of the core unit is through its connection means.

The core unit of this invention is used in a system made up of two parts. The first part, the core, houses all components generally found in laptop or desktop computers with the exception of any peripheral connector ports, display and power. The second part is the enclosure, which houses any needed peripheral connector ports (e.g. PCMCIA, serial, parallel, etc.), as well as providing power to the core unit. It is anticipated that the power is merely a pass-through. The power really comes from an external battery or AC source. The purpose for the core/enclosure design is to minimize the size of the complete system such that the enclosure or housing could always be at its smallest size. Secondly, the core can be moved from enclosure to enclosure without having to worry about configuration of the devices.

The Flint device is made up of three possible separate parts. The first part, called a cartridge, houses core processor, memory, power interface and at least one PCMCIA slot. The second part is called the chassis. The chassis also houses PCMCIA slots as well as a display interface and external connector for a LCD display or external VGA display. Flint has an expansion bus interface and connector ports (additional peripheral devices such as network interface cards). Also he has an Input/Output interface and external connector ports for (data storage devices, external keyboard, pointing devices), and finally a power supply. The third part in Flint (which could be optional) is a housing that would contain the cartridge and chassis. This housing would, in fact, be used to hold the cartridge and chassis or cartridge alone depending on what work mode/application was being used.

DISTINCTIONS OF THE PRESENT INVENTION FROM FLINT

1. In the use of the present core unit in a system requires that the enclosure dictate what functionality is available to the user. Flint requires that the cartridge and/or chassis do so.
2. The present core is designed for all applications and work modes.
3. The present system allows the enclosures to be designed for a single application or a work mode or multiple application/work mode.
4. Flint's cartridge and chassis are each designed for multiple application or work rrodes.
5. Flint is trying to duplicate computers, the present system is providing a computer function to environments that require it.
6. In the present system, the enclosures house all external peripheral connector ports.
7. Both Flint's cartridge and chassis house external peripheral connector ports.
8. The present core anticipates general computer processing in most if not all application or work modes.
9. Flint's cartridge only anticipates the use of a general CPU functionality and memory in all application or work modes.
10. Flint is in direct conflict with the objectives of the present invention. The present invention is trying to minimize the size of the system depending on the needed functionality. Flint is not concerned with this as evident in the aggressive use and the reliance of, PCMCIA slots to add functionality.
11. The system used with the core unit of this invention separates the processing functions of the computer from the external connector ports as well as the associated peripheral devices that plug into those ports.
12. The system used with the core unit of this invention does not rely on other interface modules other than power to be present in order for the system to operate.
13. Flint's cartridge does not require the chassis to provide power to their unit, it can be supplied by the cartridge itself or through a PCMCIA battery. (Col. 6 line 15.) The present system relies on the closure as a passthrough to supply the power.
14. A user cannot expand capability of the core of the present invention. Adding functionality to the present core unit can only be done through the enclosure. Flint allows the ability to extend the cartridge capability by adding components to the cartridge. Example: Flint can extend the functionality of the cartridge by adding additional (4) PCMCIA ports using a second cartridge, see FIG. 2 of Flint.

The core unit of this invention is small, compact, and self-contained. Each of the enclosures that the core unit can be inserted into can have its own set of distinct peripheral devices or peripheral connector ports for performing singular or multiple functions; for example, if a technician in a factory has the responsibility to perform inventory control, the core unit would be inserted into an enclosure that has connector ports that are specific to perform the inventory functions (e.g. port for a bar code scanner, and communications to a remote computer). If the same technician has the responsibility to repair and maintain equipment in that facility, the technician could remove the core unit from the inventory enclosure, insert the same core computer into a different enclosure that has, again, distinct peripheral devices or connector ports specific to performing maintenance functions (e.g. 1553 interface for performing non-intrusive testing of equipment, head mounted display port, and a digital multi-meter for taking electrical readings) and therefore function as a repair and maintenance computer. Additional security means can be inserted into the technician's core unit if security becomes important in use to allow only him or her access to enclosures or systems.

The same technician might also have an office and need access to, and operate from, a laptop computer. The core computer used in the above examples could also be inserted into a laptop enclosure where all peripheral connector ports, embedded peripheral devices (e.g. CD-ROM reader), and a means for providing power are in an enclosure that looks like a laptop. When the core unit is inserted into the laptop enclosure the unit would function as a traditional laptop.

The above examples show the versatility of the core computer or unit to be used in a variety or different environments and situations without the need for three different computers to perform the various functions (i.e. inventory control device, test equipment and computer, and laptop computer).

By keeping the core unit and its interface standard, users can make onetime investment in the core computer and allow enclosures to dictate the function—likewise, functions or procedures differ from company to company, therefore a company can now determine what enclosure functions are necessary to perform their missions (e.g. inventory control, repair and maintenance, general office computers) and build their enclosures as suitable.

Each of the enclosures in which the core unit can be at least partially inserted into will have their own peripheral external connecting ports; for example, if the core unit is removed from an office located computer or other enclosure, it can be inserted into a console of a car where the console has externally connected ports to car functions to be monitored for vehicle security, brakes, motor, transmission, telephone, geographical information systems, and the like. When the car is taken in for repairs, the core unit is simply removed and given to the mechanic who will then insert it into his diagnostic equipment with a suitable mating connector to determine the cause of the car problem. This would act in this instance as a "Black Box" (as used in airplanes) for cars. Additionally, the core unit when used in a car could also replicate a complete office environment. This same core unit can then be inserted, for example, into a home electrical control enclosure to regulate the on-off lights, air or heating system of the house. Naturally, the enclosures in an embodiment can have special uniquely structured connector means so as to accept the core unit with a mating connector. Therefore, the special connector core unit of this invention can be used as a single portable unit that will supply or replace office computers, car computers that regulate the memory for security, information read out, seat's temperature, etc. Home regulators of light, heat, air, and t.v., and can be used as a total core computer insert to any mobile or stationary computer. The specially designed core computer unit of this invention can easily be carried from one enclosure to another and will operate in any environment. It is truly the universal-personal computer in that it can go wherever the user goes; to be used in whatever environment he or she finds themselves in. Each enclosure in a preferred embodiment will have its own display or monitor and power source; for example, the car enclosure can have a small display on the dashboard, a mobile wearable computer (such as the Mobile Assistant) can have a head, wrist mounted, shoulder or eyeglass mounted display, the home monitoring system can use the t.v. screen as a display, etc. Obviously, if desirable and suitable, the enclosure can be used without a display. The power source available in a car, home or mobile computer such as a battery, solar, man oriented, or electrical system will be used to power the core unit of this invention. The core unit must be housed in a mating enclosure before it could function as a computer. The termed "housed" throughout this disclosure and claims means that the core unit is at least partially contained in said enclosure or in electrical or physical contact with the enclosure. The core unit of this invention can be activated by activation means connected to the enclosure such as mouse activation means, keyboard means, audio activation means, eye tracking activation means, electroencephalography activation means, pen activation means and mixtures thereof.

The components for the universal core unit of this invention can be similar to those disclosed in U.S. Pat. No. 5,305,244 which is incorporated by reference into this disclosure. The CPU, for example can be an 80286, 80386SX, 80486, or Pentium microprocessor available from Intel. The enclosures will include different interfaces and controllers for use with other types of peripherals, such as Cardbus, other communication devices, or the like. Circuit cards such as those obtained from Dover Electronics Manufacturing of Longmont, Colo. and Ampro Computers of Sunnyvale, Calif. can be used in the core unit, if desired. If the core unit is voice activated, it could contain a voice-recognition engine available from Dragon Systems, Newton, Mass. used in connection with a sound card. Other components used in the core unit of this invention are off-the-shelf presently available components such as those disclosed in U.S. Pat. No. 5,305,244 and U.S. patent application Ser. No. 08/538,194 and its continuation application filed May 22, 1997. The core unit is different in that it cannot operate as a computer until inserted into a special enclosure, which will only accept core units with a unique connector means, thus a very secure system may be provided.

The transferable and removable standardized core computer unit of this invention includes a single permanently closed housing comprising therein standard features of a self-contained general purpose computer. The enclosure unit has at least one electrical connector means for connection to a bus connection and to a source of power outside the enclosure. In one embodiment, it will only work off the source of power and security measures provided by or through an enclosure and will not function as a stand-alone unit if directly attached to a power source. The enclosure comprises peripheral connector ports or devices to cooperate with said core computer unit when said core unit is placed therein, and the core computer unit has means to cooperate with a plurality of different enclosures when inserted into said enclosures in either an original placement or transferred from another enclosure. The core computer unit has activation cooperation means for interaction with the desired activation means. The activation means are selected from the group consisting of audio activation means, communication activation means, pen activation means, brain activation means, eye-tracking activation means, mouse activation means, a keyboard activation means and mixtures thereof. Obviously, any suitable activation means may be used. The core unit has no removable components and will not function as a computer without said enclosure.

The core computer unit of this invention can be removed from a laptop enclosure and inserted into a mobile body worn enclosure to become thereby a mobile body-worn computer as another example of its use. This type of usage is important since the core unit of this invention can be interchangeably used in an infinite number of conforming enclosures with mating connector. Such an enclosure could have means to allow it to monitor all office functions, an enclosure(s) in a car, such as in the console in an arm rest or dashboard, an enclosure in other type vehicles, an enclosure in a home appliance or a house system, such as an alarm or heating system or an electrical system, in an enclosure in test equipment, television, and the like. Each enclosure is specifically structured to accept the equally specifically structured core unit of this invention. Thus, the same core unit can be used if desired in several mating enclosures in the same day or period. The core computer's memory and storage means can, for example, carry over a project from the office to the home to ensure continuity of a project, while as above noted providing optional security since it will only function in a properly mating enclosure and can employ a means that limits the specific enclosures that one, or one type of, core unit can operate with. The core unit can have such further security means included therewith. It (same core unit) can be used sequentially, for example, in the office, in the car while traveling home or at home. Each enclosure will have ports for various functions such as connection to a head set or display means. The core unit will comprise a CPU, memory means, internal non-volatile storage means, activation means, video, I/O interface and support circuitry. The core unit will not function as a computer unless it is in or on or in electrical contact with a specifically designed mating enclosure. The enclosure supplies the display when needed, the power supply (activation) for the core unit and provides the ports for peripheral external connections, such as connection to a display or printer. The enclosure and core unit have uniquely configured mating connection means for power and allowing communication of the core to the enclosure. When the enclosure already has a CPU in contact therewith, the core unit of this invention supplies the additional function desired of the core unit. When the enclosure does not have a CPU, i.e. when the enclosure is inert, the enclosure must rely upon the core unit of this invention for its general computer functions. The enclosures supply to the system herein described, the power means and connections to peripherals, such as a display, sensors and controls, etc. The enclosures are inert as a general computing device until the core unit is inserted therein, but unlike the prior art docking systems, the core unit does not function or is activated apart from the enclosure and the core unit has all of the components of a conventional computer except a display and at least one connector to a direct power connection, and communication bus; it is always activated only by a unique connection or connections to an enclosure. This is critical to the present invention. By "conventional computer" is meant a single completely closed housing comprising a CPU, memory means, internal non-volatile storage means, activation means, video, I/O interface, support circuitry, and in this case a uniquely designed connector that also connects to an enclosure power source. The enclosure is always part of another structure (never alone) such as part of a computer, telephone or local network system, car, part of test equipment, part of the electrical system of a building, etc.; it never is a stand-alone enclosure, such as the prior art docking stations unless that docking station is ultimately connected to a second structure, i.e. car. The enclosure has a uniquely designed electrical connector that only fits or mates with the uniquely designed mating connector of the core unit, such a coupling; however, may take on a number of designs.

As noted above, the core unit and the enclosure must have unique or specially designed connectors to both function and for security reasons. There are many different unconventional connectors that can be used such as specially configured tongue and groove connectors, dove tail connectors, bar connectors, slot and projection connectors, etc. The more unique the communication or connectors, the better the security of the core unit. Obviously, any other security means may be incorporated into the system of this invention if desirable to further enhance the security of the system.

DETAILED DISCUSSION OF DRAWINGS AND PREFERRED EMBODIMENTS

Figure 2:
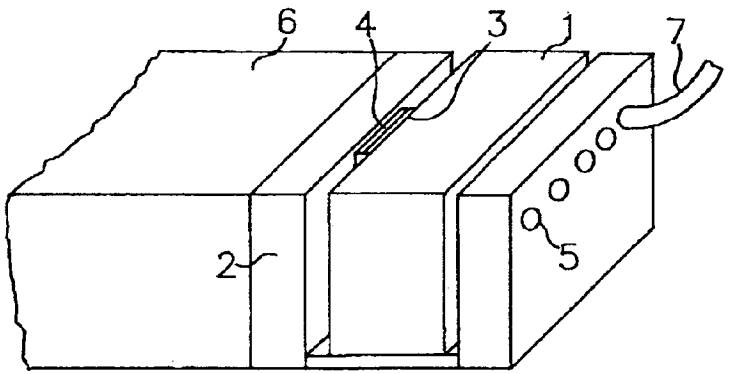
FIG. 2 is a perspective view of the core unit of this invention after inserting into the illustrated enclosure.
Figure 1:
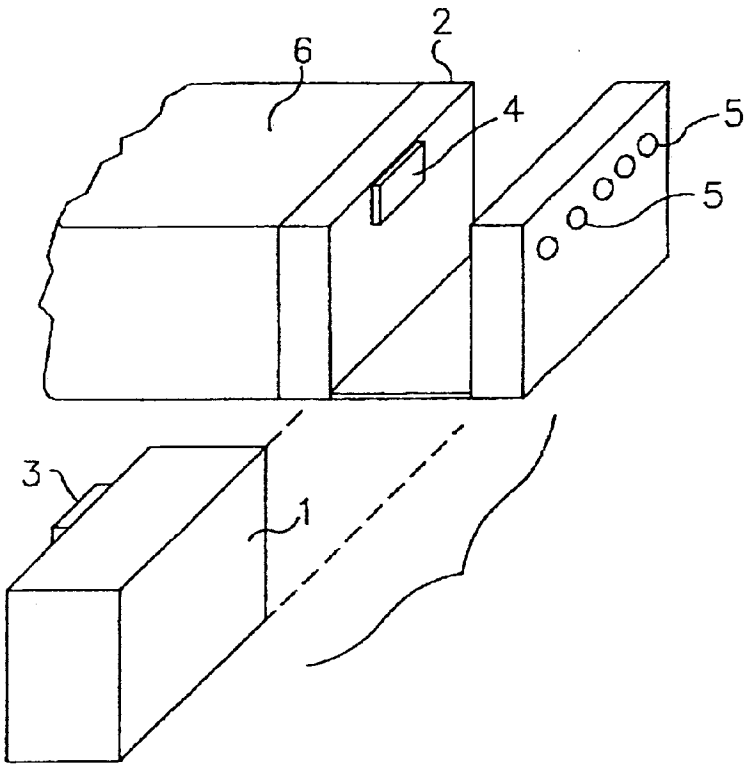
FIG. 1 is a perspective view of the core unit of this invention before the core unit is inserted into the illustrated enclosure.

In FIG. 1 a core unit 1 is shown before it is inserted into an enclosure 2. As noted above, core unit 1 contains all of the components of a conventional computer except for a display. Also the core unit 1 will not function as a computer unless it is inserted into enclosure 2. By itself core unit 1 is totally inert and no information or data can be extracted therefrom unless it is mated with an enclosure with a compatible connector means. The connector means 3 of core unit 1 is a metal bar that can be configured in any design as long as it is compatible with the connector means 4 in the enclosure 2. For security reasons, the more unique mating connector means 3 and 4 are configured, the higher degree of security to the contents of core unit 1 will be afforded. The connector means in FIG. 1 are kept relatively simple in structure for illustration purposes only, i.e. to show how they mate with each other. Obviously customized connectors with one-of-a-kind structures with for example security codes would supply optimum security. The core unit 1 does not have its own display and must rely upon enclosure 2 to supply same. This is accomplished by peripheral ports 5 in any side of the enclosure 2; these ports connect to display means or any other extended connection required. The connections of the core unit 1 to these ports is not shown in the drawings for clarity purposes; any known conventional circuitry or electrical connections obviously can be used. The enclosure 2 is always connected either directly or indirectly to a structure 6 such as the console of a car, test equipment, house electrical system, other computers, etc. Once core unit 1 is in place as shown in FIG. 2, the electrical connector means 3 and 4 engage each other and the core unit 1 is now activated and will function as a computer unit with enclosure 2. As noted earlier, the only communication with the interior computer components of core unit 1 is through connector means 3. No PCMCIA or other ports are found in core unit 1. This is important to the present invention. A monitor or display is connected thereto by cables 7, other ports or interconnectors 5 in enclosure 2 can be used for connection to other peripheral functions. In one embodiment, the core unit 1 shown in FIG. 1 if lost or misplaced would be useless to someone other than the owner of a matching enclosure 2. With customized connector means in the core 1 and enclosure 2 third parties would not gain access to information in core unit unless they also possessed similarly the matching enclosure (s). Security can be further enhanced under program control or by pre-programming before distribution. The core unit 1 by itself is inert as is the enclosure 2 by itself. In one embodiment, a core unit 1 of a user is not interchangeable with a core unit 1 of another user; each is a customized design.

Figure 3:
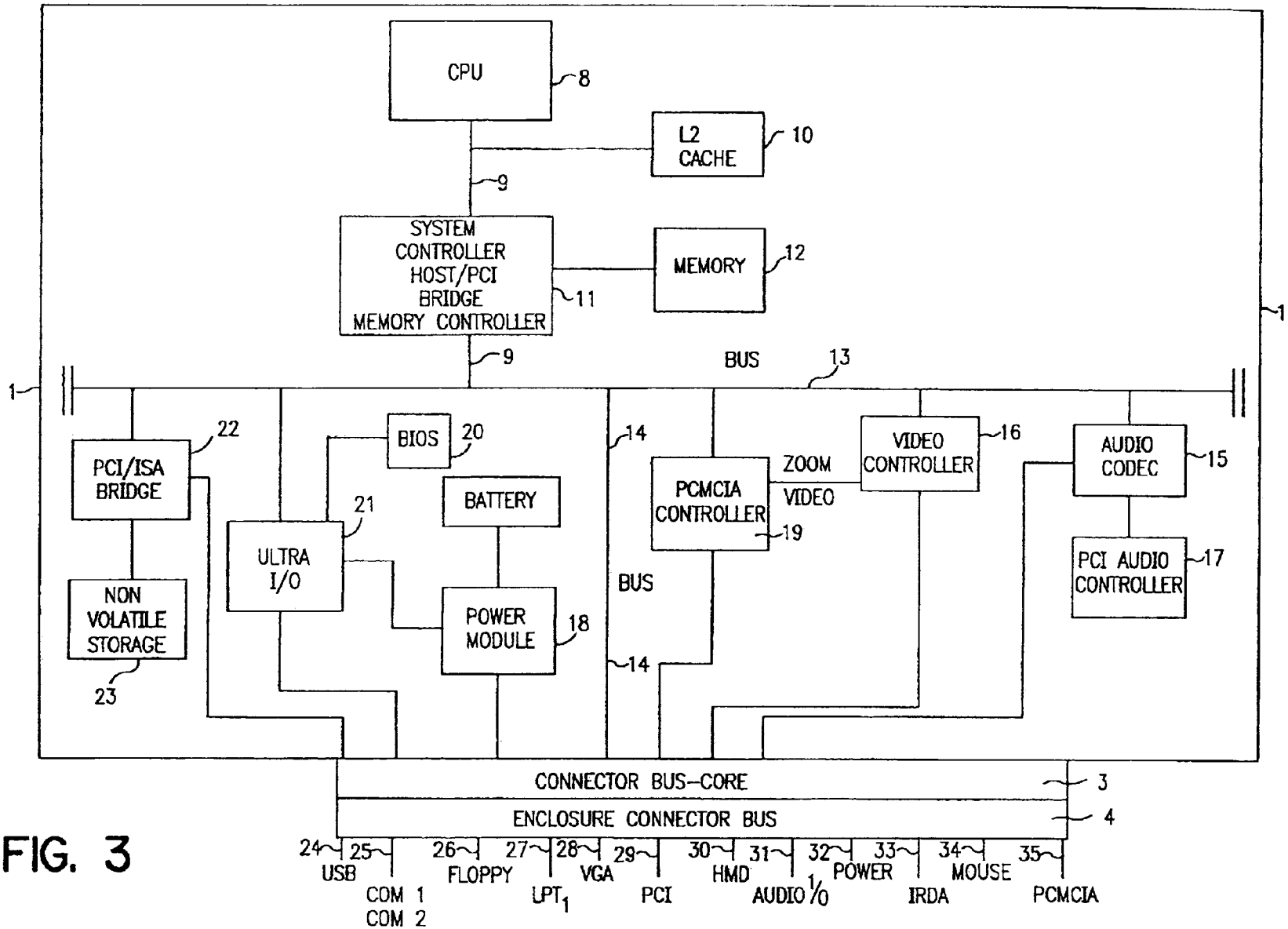
FIG. 3 is a block diagram of the internal components and external connector means of the core unit of the present invention.

In FIG. 3, a block diagram of the internal components and external connector 3 of the core unit 1 of this invention is shown. The core unit or core housing 1 completely encloses all of the internal components of the units so that it becomes tamper-proof. On the other hand, no other components can be user added to the internal structure of totally enclosed core unit 1. The only external functional components of core unit 1 is connector 3 which mates with and when functional is in contact with connector 4 of the enclosure 2. The CPU or processor 8 is shown connected to the local BUS 9 which also provides the communication with $L_2$Cache or high speed Level 2 Cache 10. Also on local BUS 9 is the system and memory controller (with host-PCI Bridge) 11. A computer memory 12 is in contact with system controller 11. A second BUS 13 and third BUS 14 are used as peripheral component interconnectors (PCI). These BUS' 13 and 14 are not a local BUS since they do not connect directly with the microprocessor. These PCI's are usually a 32 bit bus that runs at a clock speed of 33 MHz. This yields a through put rate of 132 megabytes per second; or the PCIs can be a 64-bit bus running at a clock speed of 66 MHz, however, any suitable bus structure may be used. On bus 13 is connected an Audio Coder 15 or Audio Coder PCI audio controller decoder 15 and 17. Also connected to BUS 13 is a video controller 16 which handles all display functions. A power module 18 supplies power to the entire core unit system. The PCMCIA controller 19 acts as the PCMCIA interface to the PC card subsystem. The BASIC INPUT-OUTPUT SYSTEM or BIOS 20 provides low level functions used for accessing peripherals to the system. The Input/Output interface 21 provides all input/output functions for the system. The legacy bridge 22 is the bridge to all ISA to PCI capability. The non-volatile storage 23 provides hard drives, non-rotating memory. The core connector 3 provides connection means to the enclosure 2 via enclosure connector 4. The core unit 1 remains dormant until activated by connection to the enclosure 2, wherein it becomes with the enclosure 2 functional as a computer. The connectors 3 and 4 (of the core unit 1 and enclosure 2) permit the connection of other devices or functions to the enclosure. For example, shown connected to the enclosure may be ports for the USB (universal serial bus) 24, the COM1 and COM2 (communication serial ports) 25, the floppy 26 for floppy disc connections, LPT, parallel port 27, VGA-Video graphic adapter 28, PCI-peripheral connector interface 29, the HMD 30 (head mounted display when needed), the audio input/output part 31, the power port 32 for supplying power to activate and operate the core unit 1, the IRDA-33 which is the infra red data association, mouse 34 for activation means for the system and the PCMCIA port 35 for connection to any PCMCIA card or cards.

The preferred and optimally preferred embodiments of the present invention have been described herein and shown in the accompanying drawings to illustrate the underlying principles of the invention, but it is to be understood that numerous modifications and ramifications may be made without departing from the spirit and scope of this invention.

We claim:

1. A core computer unit comprising in combination a completely enclosed housing, internal core components in said housing, and an external core connector, said internal core components comprising[, except for a display,] all of the components of a conventional computer, including internal non-volatile mass storage[means], *I/O controller, video controller, and audio controller except for a display and power supply,* all in electrical connection with said external core connector, said core computer unit having power connection means via said external core connector for electrical connection to an enclosure, without attachment to said enclosure said core computer unit is dormant and non-functional as a computer, said core computer unit not originally a component of a computer but a free standing unit originally not part of a computer, with said electrical connection said core computer unit supplying any desired computer function dictated by a plurality of different enclosures, said core *computer unit* devoid of any peripheral ports but having means to cooperate with said enclosure to supply a computer function to peripherals which are only in direct communication with said enclosure, said core computer unit having means to retain stored information even when separated from said enclosure, said stored information usable in said core computer unit with said plurality of different enclosures, said external core connectors having means adapted to cooperate with a connector in said enclosure to provide said electrical connection between said core computer unit and said enclosure, and wherein all of said internal core components in said core housing are completely enclosed therein and may not be removed, said core computer unit having means to be used interchangeably with a plurality of different type [and] *of* structured enclosures and not being a removable or replacement portion or component of a computer.

2. The core computer unit of claim 1 wherein said unit has means via said enclosure to communicate with a function selected from the group consisting of a U.S.B., communication serial ports, floppy discs, video graphic adapters, P.C.I. Bus, head mounted displays, audio input/output means, power means, IRDA means, PCMCIA cards, activation means and mixtures thereof.

3. The core computer unit of claim 1 wherein said unit has means via said enclosure to communicate with PCMCIA cards connected to said enclosure.

4. The core computer unit of claim 1 wherein said unit has means, via said enclosure to communicate with and function off an activation means selected from the group consisting of mouse activation, keyboard, audio activation, eye tracking activation means, pen activation means, electroencephalography activation means and mixture thereof.

5. The core computer unit of claim 1 wherein said unit has means for communicating with ports located in said enclosure.

6. The core computer unit of claim 1 wherein said core computer unit has means when connected to said enclosure to provide built-in capacity to interface with external sources of data and information.

7. The core computer unit of claim 1 wherein said core housing permanently encloses a processor, memory means, internal storage means, activation means, video display controller means, input/output controller means, and means for communication with outside sources of data and information.

8. The core computer unit of claim 1 wherein said power connection means comprises a connector in electrical connection to all of said internal core components and having means for only mating with a compatible connector means for said enclosure, each of said power connection means and connector means for said enclosure being specifically structured to only function with each other.

* * * * *